March 16, 1943. O. S. CARLISS 2,313,862
DYNAMOMETER FORCE MEASURING APPARATUS
Filed Dec. 14, 1940 2 Sheets-Sheet 1
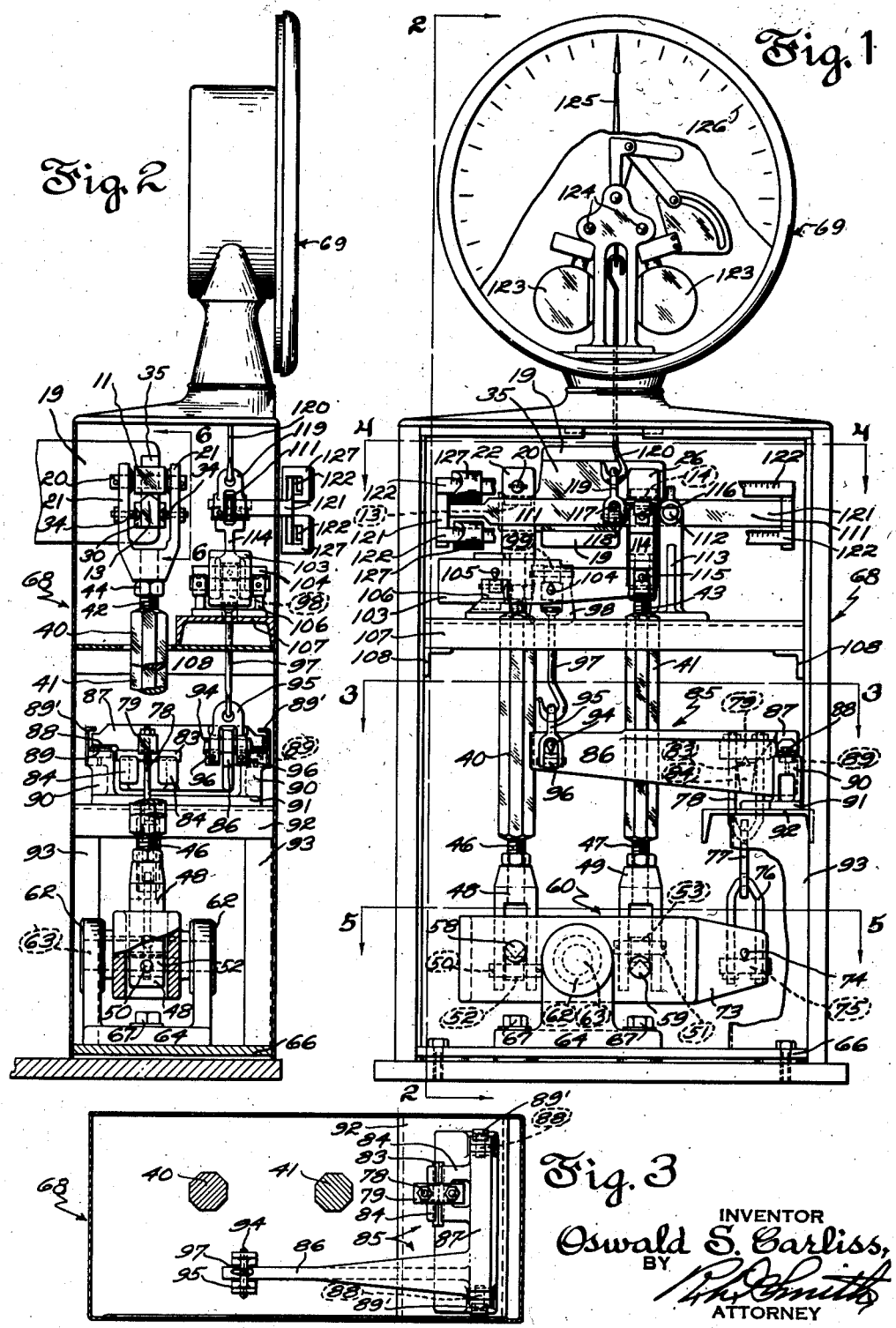
INVENTOR
Oswald S. Carliss,
BY
ATTORNEY March 16, 1943.  O. S. CARLISS  2,313,862
DYNAMOMETER FORCE MEASURING APPARATUS
Filed Dec. 14, 1940  2 Sheets-Sheet 2
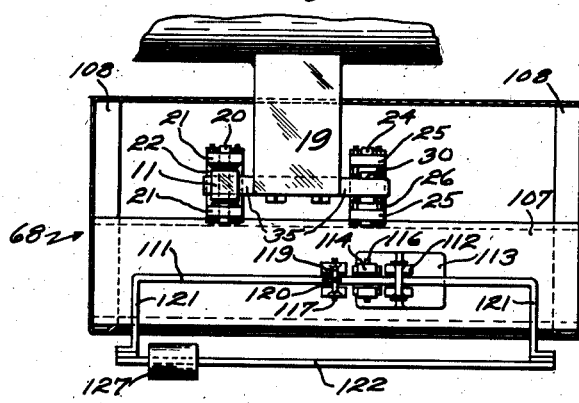
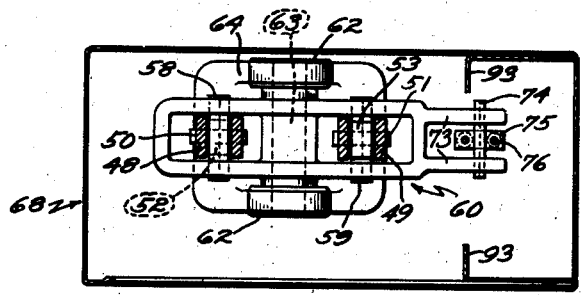
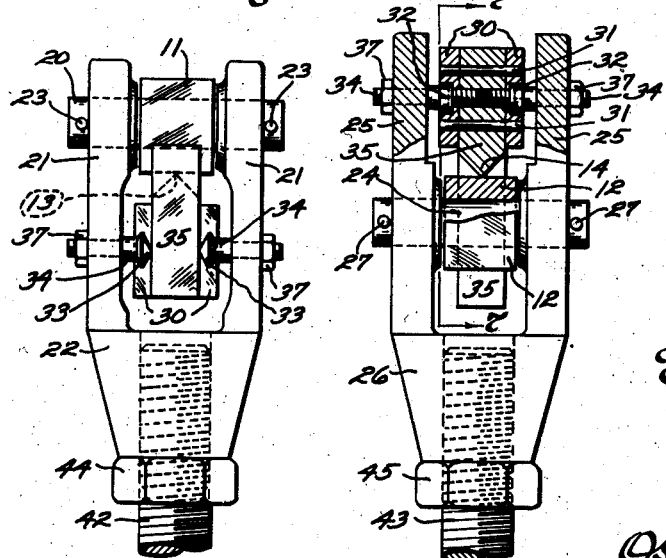
INVENTOR
Oswald S. Carliss
BY
ATTORNEY Patented Mar. 16, 1943

2,313,862

UNITED STATES PATENT OFFICE 2,313,862

DYNAMOMETER FORCE MEASURING APPARATUS

Oswald S. Carliss, Fairfield, Conn., assignor to The Kron Company, Bridgeport, Conn., a corporation of Connecticut Application December 14, 1940, Serial No. 370,097

7 Claims. (Cl. 265—62)

This invention relates to force measuring apparatus particularly equipped with a direction converting transmission thereby to be usable for counterbalancing and indicating torque forces of considerable magnitude imparted sometimes in one direction and sometimes in the opposite direction by the torque arm of a dynamometer.

In order to care for the special condition of load application wherein a load, such as the torque exerted by a dynamometer arm, may exert its force upon a common automatic counterbalancing and force measuring mechanism in a constant direction whether originating in an upward or in a downward direction, a direction converting transmission may be employed consisting of a frame fulcrumed lever and two upright coupling rods. Heretofore such transmission has been placed beneath or laterally beside the usual standard or column which houses the lever and linkage system which customarily underlies the dial head unit of a springless or pendulum type of automatic weighing scale. This has involved objectionable waste of space in the complete dynamometer when regarded as a unit wherein it is highly desirable to compact all connections between the dynamometer arm and the dial head unit into a hollow column-like housing or standard supporting the dial head unit at its top and possessing minimum height and breadth.

It is an important object of the present improvements to incorporate such a direction converting transmission in a connecting system of levers and links of optimum compactness. Also to incorporate in such direction converting transmission the ability to reduce the full magnitude of heavy torque load forces exerted by the dynamometer arm into working forces of unusually small relative magnitude before such forces come to act on the automatic counterbalancing mechanism in the dial head, thereby to enable a desirably light weight dial head unit to measure and indicate very heavy forces of torque load.

Other objects will appear in connection with specialized features of construction and arrangement pointed out hereinafter in describing the direction converting transmission. The features referred to reduce operating friction and eliminate objectionable wear and looseness between relatively moving pivotally engaged parts, and keep such parts accurately correlated for cooperating efficiently and with greater protection against accidental disturbance or impairment.

It is further desired to locate all of the connecting mechanism between the dynamometer arm and the dial head not beside, but within, a single shorter narrower and generally smaller and more slender column-like hollow structure or housing standard which consequently is enabled to support the dial head unit at a lower level for more convenient observation than has heretofore been possible in like cases where the free end of a dynamometer torque arm reaches to and works within the confines of such housing standard.

The foregoing and other objects of the present improvements will become clear in greater particular from the following description of a preferred embodiment of the invention having reference to the accompanying drawings wherein:

Fig. 1 is a front view of the dial head unit of an automatic weighing scale supported on a hollow standard whose front wall is removed to expose an interior system of levers and linkage in which is incorporated the present improvements.

Fig. 2 is a view taken in section on the plane 2—2 in Fig. 1 looking in the direction of the arrows and showing the torque arm of the dynamometer reaching to and operating within the interior of the standard.

Fig. 3 is a plan view taken in section on the plane 3—3 in Fig. 1.

Fig. 4 is a fragmentary plan view taken in section on the plane 4—4 in Fig. 1.

Fig. 5 is a plan view taken in section on the plane 5—5 in Fig. 1.

Fig. 6 is a fragmentary enlarged view looking in the direction of the arrows from the plane 6—6 in Fig. 2.

Fig. 7 is a still further enlarged fragmentary view of certain parts appearing in Fig. 6 taken partially in section on the plane 7—7 in Fig. 8, looking in the direction of the arrows.

Fig. 8 is a view taken partially in section on the plane 8—8 in Fig. 7 looking in the direction of the arrows.

Fig. 9 is an elevation drawn on the same scale as Fig. 8 looking from left to right at Fig. 6.

Fig. 10 is a plan view looking downward on Fig. 7.

The complete apparatus shown in Figs. 1 and 2 comprises means to counterbalance and measure the force of torque transmitted to the apparatus by a torque arm 19. This arm will be understood to be fixedly carried in usual manner by the rotatably mounted field frame of a dynamoelectric machine (not shown) which frame tends to turn in the direction of rotation of the armature of such machine except as resisted by one or the other of floating bearing blocks 11 or 12 which receive the thrust of knife edges 13 or 14, respectively. These knife edges are carried at opposite ends of a terminal plate 35 clamped fixedly against the extreme end of torque arm 19 by bolts 36. A conventional type of dynamoelectric machine which may be used in this connection is disclosed in greater detail in my copending application Serial No. 323,569 filed March 12, 1940, wherein arm 19 and plate 35 are identified by corresponding reference numerals. From the aforesaid copending application it will be understood that the shaft of an engine, motor, or other prime mover whose horsepower is to be measured, is coupled impellingly to the armature shaft of the before mentioned dynamoelectric machine so as to rotate said armature while the engine or motor is running. The work thus produced is absorbed through the medium of electrical energy produced by the dynamoelectric machine and a resultant torque force is exerted by arm 19 upward or downward depending on the direction of armature rotation.

Bearing block 11 is freely rotatable on a pivot pin 20. This pin spans the space between arms 21 of the up-action yoke or shackle 22 and has its ends supported in the latter and is retained by cotter pins 23 or the like. Bearing block 12 is freely rotatable on a similar pivot pin 24. This pin spans the space between arms 25 of the down-action yoke or shackle 26 and has its ends supported in the latter and is retained by cotter pins 27 of the like. Each face of each end portion of plate 35 above or below its knife edges 13 and 14 is, according to these improvements, equipped with a boss-like projecting abutment or thrust block 30 which if made as a separately attached part may be steadied in relation to plate 35 by dowels 31 and clamped firmly against such plate by a holding bolt 32. The head of such bolt may contain a socket to accommodate a wrench, instead of a slot to take a screw driver. Each vertical edge of each thrust block 30 falls tangent to the largest periphery of the cone-shaped head 33 of a guide stud 34 whose pointed end may contact with that face of plate 35 against which thrust block 30 is secured. Each guide stud 34 is shouldered thereby to seat against the inner surface of shackle arm 21 or 25 and is held tightly against such arm by a nut 37 on the threaded end portion of a shank 38 of the guide stud. Shank 38 is of reduced diameter and passes through a hole in the shackle arm. Each pair of coaxially aligned guide studs 34 have their opposed head points spaced apart sufficiently to permit free vertical movement of plate 35 therebetween without binding, but they afford very little clearance for said plate horizontally and therefore the two pairs of these studs carried by each shackle maintain the shackle nicely aligned with the knife edge on the terminal plate so that the bearing blocks 11 or 12 for such knife edge need not be provided with the usual V-groove for seating the knife edge 13 or 14, but instead these bearing blocks may have a perfectly flat, hardened, horizontal top surface contacted by its cooperative knife edge with greater freedom from friction, wear, and liability to derangement or irregularity in operation.

Two vertical coupling rods 40, 41 depend respectively from the shackles 22 and 26 and have top ends 42, 43 of reduced diameter in threaded engagement with said shackles, respectively, and locked against turning relative thereto by check nuts 44, 45. Coupling rods 40 and 41 have similar bottom ends 46, 47 of reduced diameter which are in threaded engagement respectively with two downward directed shackles 48 and 49. Spaced arms of shackles 48, and 49 carry pivot pins 50 and 51 on which bearing blocks 52 and 53 are respectively mounted and free to turn.

Bearing block 52 contacts with a knife-edge 58 and bearing block 53 contacts with a knife-edge 59, both of which knife edges are fixedly mounted on the same direction converting lever 60 at exactly equal distances from the fulcrum thereof. As herein shown, this fulcrum may include ball bearings 62 affording pivotal support for the fulcrum shaft 63 and lodged respectively in the upstanding spaced arms of a stationary bearing bracket 64 which is fixedly secured on the base plate 66 of a hollow column or housing standard 68 by bolts 67. This column or housing standard includes frame work which supports at its top a dial head unit designated as a whole by 69. This unit may be constructed as illustrated and described in the U. S. Patent No. 2,083,413, granted June 8, 1937, to Glenn E. Weist.

As best shown in Figs. 1, 2 and 5, the aforesaid direction converting lever 60 is bifurcate, providing a central opening spanned by fixedly carried knife-edges 58, 59 and accommodating the shackles 48 and 49. This lever also has a forked terminal portion 73, the space between whose arms is spanned by a knife-edge 74 fixed in the lever. Said space accommodates a bearing pan 75 engaged by knife edge 74 and carried by a lower clevis 76 suspended from a link 77 which is coupled to an upper clevis 78 provided with the inverted bearing pan 79.

It will be observed at this point that the entire vertical length of the housing space within standard 68 is taken up by the direction converting lever 60, together with the superimposed coupling rods 40, 41, and the torque arm 19. The present improvements propose to avoid the necessity of further increasing this vertical length of standard 68 in order to accommodate the addition of further links and levers, by placing the latter in a second and separate vertical series or plane at the front of said torque arm and coupling rods and at the same height levels therewith inside of the housing standard. To accomplish this, I resort to a type of duplex lever unusual in scale mechanism and which at the same time effects leverage reduction by virtue of its own construction. This duplex lever is next described.

Bearing pan 79 rests rockably upon a knife-edge 83 bridging a gap between two short lugs 84 which together may constitute the short arm of the above mentioned duplex shelf lever designated as a whole by 85 and whose long arm is 86. These arms are connected by and are preferably integral with a substantially elongated hub 87 which carries at its extreme ends, and well outside of the vertical planes of action of lugs 84 and arm 86, downward directed knife-edges 88, 88 which are rockably seated on hardened fulcrum blocks 89, 89 respectively supported on the tops of posts 90, 90 and guarded against dislodgement by suitable retaining structures as 89', 89'. These posts upstand from a common bracket base 91 fixedly mounted on a horizontal channel-iron frame support 92 which bridges the tops of channel-iron frame uprights 93 made fast to the base plate 66 of standard 68. The free end of long arm 86 of shelf lever 85 is provided with a knife-edge 94 projecting at each side thereof and is straddled by the clevis yoke 95 whose bearing pans 96 contact the knife edge 94. It is especially noted that the point of bearing of pan 79 upon knife-edge 83 falls within the area of a triangle composed of straight lines connecting fulcrums 88, 88 and connecting each of the latter with coupling pivot 94.

Yoke 95, together with hook link 97 and its top clevis 98 and bearing pan 99 of said top clevis, serve to couple the long arm 86 of shelf lever 85 to a force reducing lever 103. Lever 103 fixedly carries the knife-edge 104 which supports bearing pan 99 at a relatively short lever-arm distance from the inverted fulcrum knife-edge 105 which is also fixed in lever 103 and rockably seated on suitable fulcrum blocks stationed atop the U-shaped frame bracket 106. This bracket is mounted on channel iron 107 of the frame which is supported from the side structure of standard 68 with the help of angle irons 108.

In addition to the reducing lever 103 the hollow standard 68 contains the conventional tare lever 111 rockably supported on a pivotal fulcrum 112 carried on an upright bracket 113 which is fixedly mounted on channel iron 107 of the frame. Any conventional form of universal coupling link 114 may connect knife-edge 115, which is fixed on reducing lever 103 at a greater lever arm distance from fulcrum 105 than is knife-edge 104, with knife-edge 116 which is fixed on the tare lever 111. Another knife-edge 117 on tare lever 111 contacts with the bearing pan 118 of a coupling yoke 119 which latter is connected by draft rod 120 with the pendulum type of automatic load counterbalancing and measuring mechanism of the dial head unit 69.

Complete details of the dial head unit are more thoroughly set forth in the before mentioned patent, No. 2,013,485, granted to G. E. Weist. It will suffice to mention here that as in the case of my hereinbefore mentioned copending application, the dial head unit includes load force counterbalancing pendulums 123 whose swinging movements about frame pivots 124 are converted into rotary movement of the indicator pointer 125 so that the latter sweeps over a scale of force indicating graduations 126 shown in Fig. 1. The tare lever 111 may carry by means of arms 121 one or more graduated tare beams 122 equipped with slidable poises such as 127.

In operation it will be understood that torque arm 19 is mounted to swing about an axis displaced a considerable distance horizontally to the left of the force exerting end of this arm shown in Fig. 2. Actually it performs only a very small increment of movement which in Fig. 2 will be either upward or downward in practically a vertical direction. In Fig. 1 when torque arm 19 tends to move downward it causes knife-edge 14 to depress bearing block 12 and coupling rod 41 and hence swing lever 60 clockwise about its fulcrum 62. This draws downward on the linkage 76, 77, 78 with a reduction of force owing to the knife-edge 74 having a greater lever arm with respect to fulcrum 62 than has knife-edge 59. Hence a once reduced force is thus imparted to the duplex shelf lever 85 urging the latter counterclockwise or downward about its fulcrum 89. Consequently the long arm 86 of shelf lever 85 pulls downward through the linkage 95, 97, 98 on the force reducing lever 103. But up to this point a second reduction of force has been effected because knife edge 94 has a greater lever arm with respect to fulcrum 89 than has knife-edge 83. The consequent downward pull on force reducing lever 103 urges the latter clockwise about its fulcrum 105 so that through linkage 114 the tare lever 111 is urged counterclockwise about its fulcrum 112 by a still further diminished force because knife-edge 115 has a greater lever arm with respect to fulcrum 105 than has knife-edge 104. This thrice reduced force as imparted to tare lever 111 acts through linkage 119, 120 to lift the pendulums 123 of the automatic load counterbalancing mechanism of the dial head unit whose force indicating pointer 125 sweeps over a scale of graduations 126 to register the force exerted by torque arm 19.

When the torque arm exerts an upward instead of a downward pressure, this force instead of being resisted by bearing block 12 will be resisted by bearing block 11 seated on knife-edge 13. Through this medium, coupling rod 40 will be pulled upward and will act on knife-edge 58 to impart clockwise movement to direction reversing lever 60 in Fig. 1 just as in the case of the downward thrust on coupling rod 41 whereby the force exerted upward by torque arm 19 will be reduced once by lever 60, again by lever 85, and still again by lever 103 before being transmitted to the tare lever 111, all as described in the foregoing.

The restriction of play in a horizontal direction provided by studs 34, of which there are two spaced crosswise of the line of movement on each side of each end of plate 35, makes it possible to provide bearing blocks 11 and 12 with entirely plain flat surfaces omitting the usual V-groove therein for seating the knife-edges. This restriction of play will be observed to be effective endwise of plate 35 because of the engagement of the narrowed circular edge of stud heads 33 with thrust blocks 30 and effective laterally of plate 35 because of the engagement of the pointed ends of the stud heads 33 with the front and rear faces of plate 35. Enough clearance is provided between these stud heads and the constrained portions of the plate 35 including thrust blocks 30 to permit the latter to move in unison with bearing blocks 11 and 12 upward and downward entirely free of cramping or appreciable frictional resistance despite the small relative movement which must take place between plate 35 and yokes 22, 26.

I may omit one of the thrust blocks 30 and both of the studs 34 shown to cooperate therewith in Fig. 10 and in the place of such thrust block and studs I may place a single stud like 34 preferably central of the distance between the remaining pair of studs 34, or in other words with its pointed head 33 in position to contact with the face of plate 35 at a point centrally opposite the remaining thrust block 30. This would afford 3-point instead of 4-point facewise constraint and impose upon only two studs and one thrust block the duty of edgewise constraint between plate 35 and either shackle 22 or 26.

Specific knife edge bearing constructions and details of associated thrust taking elements are not claimed in this application but are the subject of claims in my copending applications, Serial No. 402,312, filed July 14, 1941, divisional herefrom, and Serial No. 429,289, filed February 2, 1942, a continuation hereof in part.

The appended claims will be understood to contemplate and cover all substitutes and equivalents for the particular shapes and arrangements of parts herein disclosed to illustrate a successfully workable form of the invention.

I claim:

1. In a dynamometer including the torque arm of a dynamoelectric power absorbing machine and a force counterbalancing and indicating mechanism, a compacted apparatus for transmitting force from said arm to said mechanism embodying in combination, a direction converting lever and optionally operative draft elements connecting the same to said torque arm constructed and arranged to perform movement in a common vertical rear plane reached by the force exerting end of said torque arm, at least one force reducing lever and cooperative draft connections coupling the same to said mechanism located at least in part at a common height level with said torque arm and constructed and arranged to perform movement in another common vertical plane in front of said rear vertical plane, a frame fulcrum, and a fulcrum supported duplex shelf-lever having spaced co-directional arms respectively occupying said rear and front planes and respectively coupled to said direction converting lever and to said force reducing lever, whereby the space occupied by said direction converting lever and draft elements involves no increase in height or breadth of the space occupied by said force reducing lever and draft connections.

2. In a dynamometer as defined in claim 1, a compacted force transmitting apparatus as defined in said claim in which the said direction converting lever is fulcrumed at a mean point in its length, together with three knife-edges carried by said converting lever, two of said knife-edges being equidistant from said fulcrum point and engaging with the said draft elements and the remaining knife-edge being at a greater distance from said fulcrum point and coupled to the said duplex shelf-lever.

3. In a dynamometer as defined in claim 1, a compacted force transmitting apparatus as defined in said claim, in which the said duplex shelf-lever includes an elongated hub joining the said co-directional arms thereof and passing extending crosswise through the said rear and front planes and extending at its ends respectively there-beyond, together with a downward disposed knife-edge fixed in each of said ends of said hub to afford a fulcrum bearing for said shelf-lever at points more widely separated than are its said co-directional arms.

4. In a dynamometer as defined in claim 1, a compacted force transmitting apparatus as defined in said claim in which the said direction converting lever is fulcrumed at a mean point in its length and the said duplex shelf-lever includes an elongated hub joining the said co-directional arms thereof and extending crosswise through the said rear and front planes and extending at its ends respectively therebeyond, together with three knife-edges carried by said converting lever two of which three knife-edges are equidistance from and on opposite sides of said fulcrum point and engage with the said draft elements and the third of which knife-edges is at a greater distance from said fulcrum point and coupled to one of said co-directional arms of said shelf-lever, together with a downward disposed knife-edge fixed in each of said ends of said elongated hub of the shelf lever to afford fulcrum bearings for said shelf-lever at points more widely separated than are said co-directional arms.

5. In a dynamometer as defined in claim 1, a compacted force transmitting apparatus as defined in said claim in which the said direction converting lever is coupled to the said duplex shelf lever at a greater lever arm distance than said direction converting lever is coupled to the said torque arm, and in which the said duplex shelf lever is coupled to the said force reducing lever at a greater lever arm distance than said shelf-lever is coupled to said direction converting lever, whereby the force exerted by said torque arm is reduced both by said converting lever and by said shelf-lever before said force is transmitted therethrough to the said force counterbalancing and indicating mechanism.

6. In a dynamometer as defined in claim 1, a compacted apparatus for transmitting force as defined in said claim, in which the said spaced co-directional arms of the said duplex shelf-lever are of substantially different lengths, the longer of said arms being coupled to the said force reducing lever and the shorter of said arms being coupled to the said direction converting lever.

7. In a dynamometer as defined in claim 1, a compacted apparatus for transmitting force as defined in said claim, in which the said spaced co-directional arms of the said duplex shelf-lever are of substantially different lengths, the longer of said arms being coupled to the said force reducing lever and the shorter of said arms being coupled to the said direction converting lever, together with seating means carried by said shelf-lever resting in contact with said frame fulcrum at points separated more widely than the distance between said shorter and longer lever arms, the point of coupling of said shorter arm to said direction converting lever falling within the area of a triangle having its corners located respectively at said separated points of fulcrum contact and said point of coupling of said longer arm.

OSWALD S. CARLISS.

CERTIFICATE OF CORRECTION.

Patent No. 2,313,862.     March 16, 1943.

OSWALD S. CARLISS.

It is hereby certified that error appears in the printed specification of the above numbered patent requiring correction as follows: Page 2, first column, line 33, for the words "of the like" read --or the like--; page 4, first column, line 43, claim 3, strike out "passing"; and that the said Letters Patent should be read with this correction therein that the same may conform to the record of the case in the Patent Office.

Signed and sealed this 11th day of May, A. D. 1943.

(Seal)
. Henry Van Arsdale,
Acting Commissioner of Patents.